Oct. 29, 1968   N. T. SCHMIDT   3,407,941
GARBAGE CAN RACK

Filed July 27, 1966   2 Sheets-Sheet 1

Norbert T. Schmidt
INVENTOR.

BY *Clarence A. O'Brien*
*and Harvey B. Jacobson*
Attorneys

Oct. 29, 1968  N. T. SCHMIDT  3,407,941
GARBAGE CAN RACK
Filed July 27, 1966  2 Sheets-Sheet 2
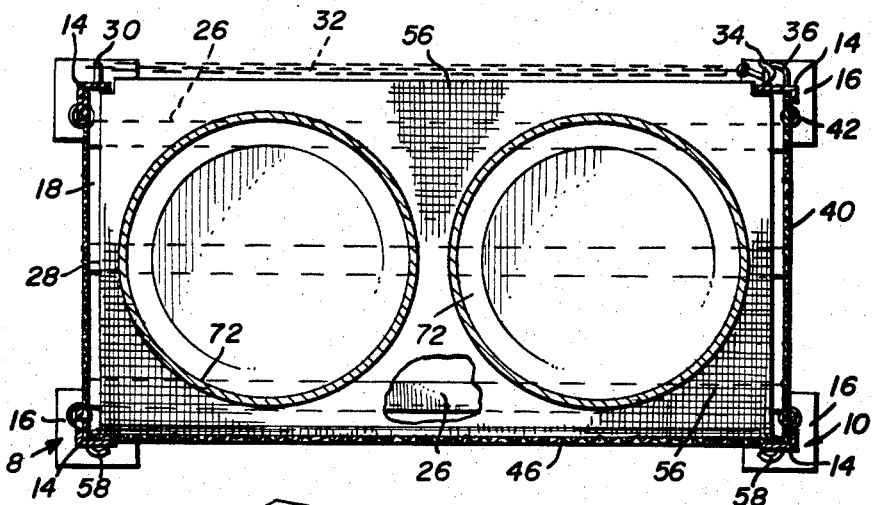
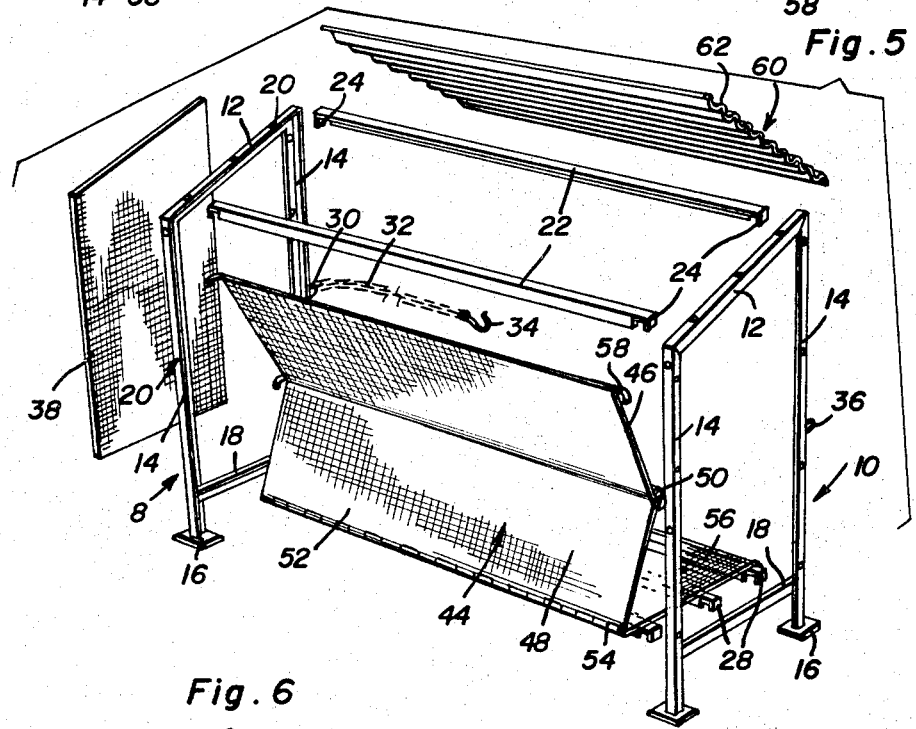
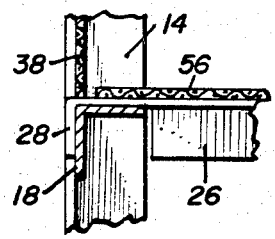
Norbert T. Schmidt
INVENTOR.
BY
Attorneys United States Patent Office 3,407,941
Patented Oct. 29, 1968

3,407,941
GARBAGE CAN RACK
Norbert T. Schmidt, 1219 Bryant St.,
Alexandria, Minn. 56308
Filed July 27, 1966, Ser. No. 568,340
4 Claims. (Cl. 211—177)

ABSTRACT OF THE DISCLOSURE

An outdoor shed-like rack designed to enclose bodily insertable and removable garbage and trash cans. It comprises a self-standing frame structure provided with bottom, back, end and top walls. It is wholly open at its front. The top wall is imperforate and preferably but not necessarily corrugated. The bottom wall is elevated above the level of the ground to preserve said bottom wall and the cans and particularly the bottom portions of the cans. The bottom wall, back and end walls are made from screen material capable of screening out debris and functioning to minimize access to the cans by dogs, cats and other pests. The screen walls provide for adequate ventilation for the enclosed can space. Chain means is stretched across the open front to assist in holding the cans within the confines of the rack.

---

The present invention relates to certain new and useful improvements in a rack which is expressly designed and adapted to effectually shield and enclose conventional garbage and trash cans and which, because it is primarily for outdoor use, is characterized by a shed-like rack or shelter.

Although vertical lattice-work screens and enclosures, with and without a roof, are in use in residential backyards, there has long existed a need for a simple, practical and portable can sheltering rack, that is, a specially made adaptation characterized by coacting walls made of screen material and which house the cans and effectively ward off certain pests such as insects, cats, dogs, squirrels and small animals. To the ends desired, the rack herein shown is characterized by a frame structure and readily attachable and detachable walls whereby to thus provide an adaptation which is capable of being packaged and shipped in knockdown form and subsequently readily erected on the premises at a convenient place of use.

In carrying out the present invention, the frame structure is made up of a plurality of suitably constructed and cooperating frame members. More specifically, vertical end frames of general inverted U-shape form and suitably connected by upper and lower angle irons (the latter forming significant components of the bottom wall) and a plastic or equivalent imperforate corrugated or equivalent roof which has its ends wired, linked, or otherwise connected with the top members of the vertical end frames.

Novelty is predicated on a structure characterized by the aforementioned features and wherein the end walls are made of suitable screen material, the bottom wall being likewise a screen which is reinforced by attached angle irons, or equivalent members, and the back wall being made of screen material but uniquely characterized by hingedly joined half-sections capable of being collapsed into compact and convenient form for storage, shipping, handling, erection and dismantling if and when necessary or desired.

As will be hereinafter more clearly understood and appreciated, further novelty is predicated on wall means wherein the bottom screen wall is welded atop several spaced parallel horizontal angle irons, said angle irons provided at their respective ends with terminal hooks adapted to be releasably engaged over braces provided therefor at the lower portions of the end frames. Then, too, novelty is predicated on the angle-iron-reinforced bottom wall in conjunction with the aforementioned back wall made up of the hingedly connected half-sections thus providing a triple-part compact and convenient unit which is advantageous in that it should appeal to the manufacturing economies of manufacturers, should be susceptible of endorsement by wholesalers and retailers, and aptly and appropriately usable by purchasers, particularly those who take pride in concealing garbage and trash cans.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a horizontal section with a portion broken away, taken on the plane of the horizontal line 3—3 of FIGURE 2.

FIGURE 5 is an exploded perspective view wherein all of the essential or component parts are individually shown in cooperatively or mating relationship.

FIGURE 6 is a detailed section on the line 6—6 of FIGURE 2 suitably enlarged.

Figure 1:
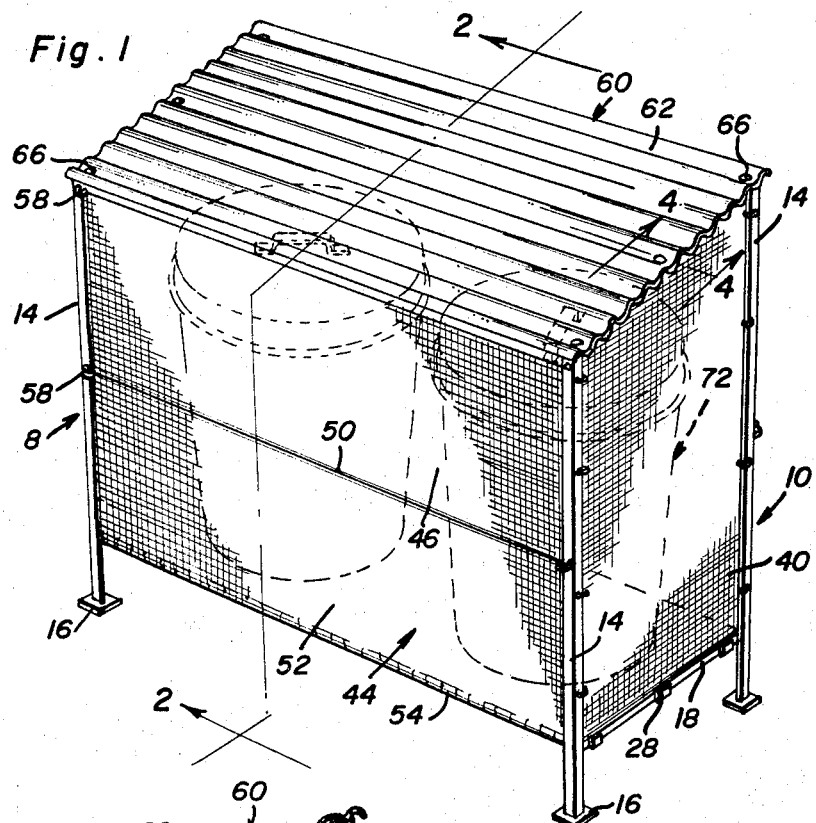
FIGURE 1 is a view in perspective of a garbage and trash can enclosing shed-like rack constructed in accordance with the principles of the invention observing the same from the rear non-open side.
Figure 2:
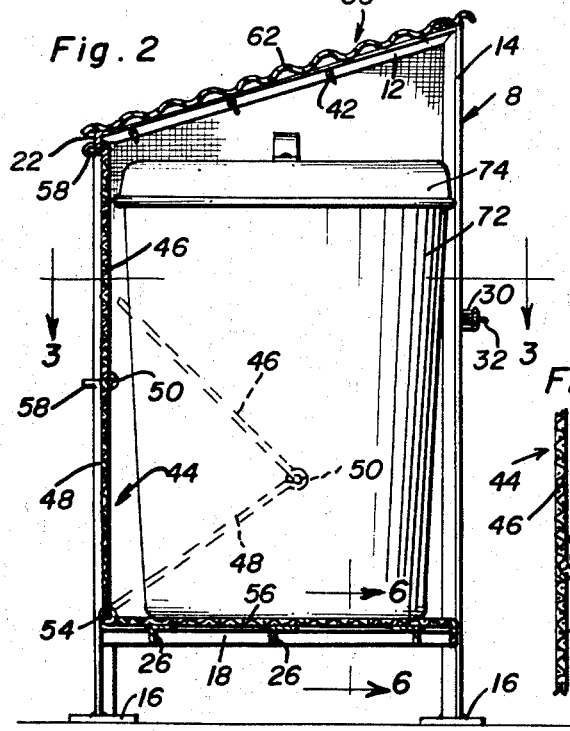
FIGURE 2 is a vertical sectional view taken on the plane of the section line 2—2 of FIGURE 1 looking in the direction of the arrows and showing at least one of the readily insertable and removably garbage cans and also showing, in dotted lines, the foldability of the sectional back wall.

It is believed that reference to FIGURES 1, 2, 3 and 5 in particular will acquaint the reader with the preferred embodiment of the invention. Looking at FIGURE 5 it will be seen that the inverted U-shaped end frame at the left is denoted by the numeral 8 while the companion frame at the right is denoted by the numeral 10. Both frames are the same in construction. It will suffice to show that each end frame comprises an upper rearwardly and downwardly inclined bight portion 12 joined at its ends to coplanar vertical legs 14. The lower ends of these legs are provided with suitable block-like plates providing feet 16 capable of resting on the ground, concrete foundation or other support surface. Just above the feet, horizontal reinforcing cross-braces 18 are provided. It will be noted that each of the members which make up the frame comprises a simple angle iron. At certain points holes or apertures 20 (FIG. 5) are provided for assembling purposes, as will be hereinafter seen. The two end frames 8 and 10 are partially connected together by a pair of front and rear horizontal top rails 22 which are identical in construction. These rails are of suitable length and each rail is provided at its ends with down bent hooks 24 which are capable of being removably engaged over the inclined bight portions or frame members 12. There are several similar angle irons or rails denoted at 26 (located at the bottom) and they correspond in length with the rails 22 and are likewise provided at outer ends with downbent hooks 28 which are releasably engageable over the aforementioned braces 18. These bottom rails or angle irons 26 constitute components of a multiple part wall unit which will be later described. The point to be noted is that no special bolts or headed screw-threaded fasteners are needed in order to erect this type of an openwork frame structure. With continuing reference to FIGURE 5 the numeral 30 designates an eye to which one end of a chain 32 is connected. The other end of the chain is provided with an attaching and retaining hook 34 which is releasably engageable with a second eye or staple 36 whereby to provide a chain which extends across the open front of the over-all rack, that is when the rack is set up for use in the manner shown for example in FIGURES 1 and 2.

Briefly reviewing the component parts so far stressed it will be seen that the openwork frame structure is characterized by left and right inverted U-shaped angle iron type end frames 8 and 10 having horizontal braces 18 at the bottom portions and with the upper angle irons 12 sloping downwardly from the open side to the rear closed side, said frames being linked or connected together by the upper angle iron rails 22 and hooks 24 and lower angle iron rails 26 with their end hooks 28.

One end wall comprises a screen or panel of self-shape sustaining screen material and it is denoted by the numeral 38 and it is fitted within the confines of the abutting flanges of the angle iron components 12 and 14 in particular of the end frame, say the frame 8 at the left. The same construction is carried out at the other end and accordingly, the right hand end wall or screen panel 40 is applied and installed as shown. To accomplish this rings or connecting wires 42 are provided and threaded through the mesh of the screens and openings 20 provided in the coacting angle irons.

Taking up now the back wall means it will be seen (FIGURE 5) that this wall means actually embodies a dual-type back wall which is denoted generally by the numeral 44 and comprises an upper right rectangular half-section 46 hinged to a lower half section 48 as at 50. The lower edge portion 52 of the lower half-section is hingedly joined at 54 to a rearward longitudinal edge portion of a third screen section 56 which constitutes the bottom wall. This bottom wall is welded or otherwise connected to the horizontal flanges of the several irons 26, in the manner shown in FIGURE 2. Therefore, this wall unit actually comprises the horizontal bottom wall 56 and the hinged sections 46 and 48 which make up the over-all vertical back wall. The back wall sections or components are provided with assembling and connecting wires 58 which are suitably available and which can be passed through certain of the openings 20 provided therefor whereby to thus connect the back wall between the two upstanding end frames 8 and 10. By employing three hinged screen sections and joining the bottom section 56 with the angle irons 26, a multi-part unit is provided which makes for compactness and convenience, ready assembling, dismantling, storage and transportation in what is believed to be an obvious manner.

Figure 4:
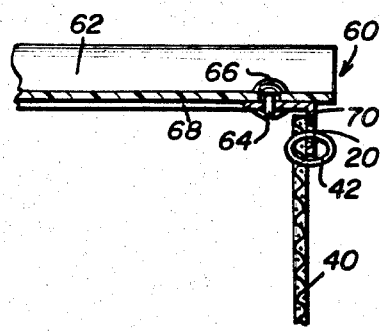
FIGURE 4 is an enlarged fragmentary detailed section on the plane of the section line 4—4 of FIGURE 1.
Figure 7:
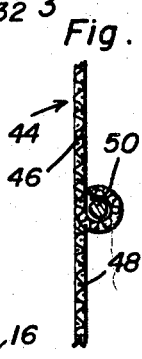
FIGURE 7 is a detail sectional view of the hinging means for the upper and lower half sections of the back wall.

The top wall is distinct and different from the other walls and is therefore denoted by the numeral 60 and it is made from a moldable sheet of imperforate corrugated plastic. The sheet is substantially rectangular and of suitable size and the corrugations are denoted at 62. The end portions of the corrugated top wall reside atop the underlying flange of the uppermost angle irons 12 and the angle irons are provided with apertures to accommodate prongs 64 which are provided on assembling rivets 66. For convenience of description one such angle iron 12 is detailed in FIGURE 4 and wherein it will be observed that it is the horizontal flange 68 which is apertured to accommodate the headed rivets 66. The vertical flange 70 serves to accommodate the aforementioned assembling rings or wires 42 in the manner shown.

The shed-like enclosure is thus provided with a suitably fabricated attachable and detachable bottom wall, a hinged sectional back wall, end screen walls or panels and a corrugated top wall. With this open front construction the garbage cans 72 with suitable lids 74 can be bodily inserted and removed. This construction and arrangement is brought out in FIGURES 2 and 3 wherein it will be evident that the aforementioned safety chain 32 serves to guard against unintentional removal of the lidded cans 72. It will be further noted that the height of the top wall is such that there is sufficient clearance between the lid and mouth of the can to permit the top to be raised and lowered and otherwise handled for replacement of the can within the confines of the rack. In addition it will be noted that the bottom wall is suitably elevated so that the wall itself and also the bottom portions of the cans are protected against undue wear, tear and deterioration from rusting.

It is submitted that the open front chain-equipped wall enclosed, frame supported shelter or shed-type rack herein showed and described is an innovation and accordingly an advance in the art of garbage and trash can racks. It is further submitted that the construction of the component parts, the manner in which they are assembled and disassembled is clear from the views of the drawing and specification. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable knockdown shelter-like can rack comprising a knockdown frame structure embodying a pair of duplicate vertically disposed inverted U-shaped end frames, each end frame having a rearwardly and downwardly inclined upper frame member and depending frame members terminating at lower ends in ground contacting feet, the lower end portions of said frame members being joined by a horizontal reinforcing brace, a pair of upper rails having downturned hooks at their respective outer terminal ends releasably engaged over the upper members of said end frames, a plurality of lower rails having outer terminal ends provided with hooks releasably engaged over said braces and thus providing said frame structure and, in combination, a top wall providing a roof, said top wall being imperforate and having end portions detachably connected to coacting upper frame members of the respective U-shaped end frames.

2. A portable knockdown shelter-like can rack comprising, in combination, a knockdown frame structure embodying a pair of duplicate vertically disposed inverted U-shaped end frames, each end frame having a rearwardly and downwardly inclined upper frame member and depending frame members terminaitng at lower ends in ground contacting feet, the lower end portions of said frame members being joined by a horizontal reinforcing brace, all of said members comprising angle irons, a pair of upper rails also angle irons having downturned hooks at their terminal ends releasably engaged over the upper members of said end frames, a plurality of similar downwardly disposed angle irons having hooks at their outer terminal ends releasably engaged over said braces, thus providing said frame structure and, in combination, a corrugated top wall providing a roof, said top wall being imperforate and having end portions superimposed upon and detachably connected to upper frame members of the respective U-shaped end frames.

3. The structure according to claim 2, and, in combination, a pair of screen-type vertical end walls detachably connected to the respective end frames, a screen-type rear wall having end portions detachably connected with the respectively cooperable end frames, and a screen-type bottom fall superimposed upon and secured to said bottom rails, said rear wall comprising hingedly joined sections and one of said sections being hingedly joined to said bottom wall.

4. The structure defined in claim 3 and wherein said structure is open at the front, said front being provided with an attachable and detachable chain which can be stretched across the front in a manner to assist in holding the cans in a racked position seated on the bottom wall.

References Cited

UNITED STATES PATENTS

| | | | |
|---|---|---|---|
| 1,363,130 | 12/1920 | Kuder | 312—213 |
| 2,558,939 | 7/1951 | Dornbush | 312—257 X |
| 2,793,401 | 5/1957 | Paschke | 52—90 X |
| 2,839,200 | 6/1958 | Easterwood | 211—182 X |
| 2,994,441 | 8/1961 | Browning | 211—177 |
| 3,101,226 | 8/1963 | Cochran | 312—257 |
| 3,211,509 | 10/1965 | Sender | 312—329 |
| 3,260,561 | 7/1966 | Traktman | 312—264 X |

ROY D. FRAZIER, *Primary Examiner.*